United States Patent Office 3,115,770
Patented Dec. 31, 1963

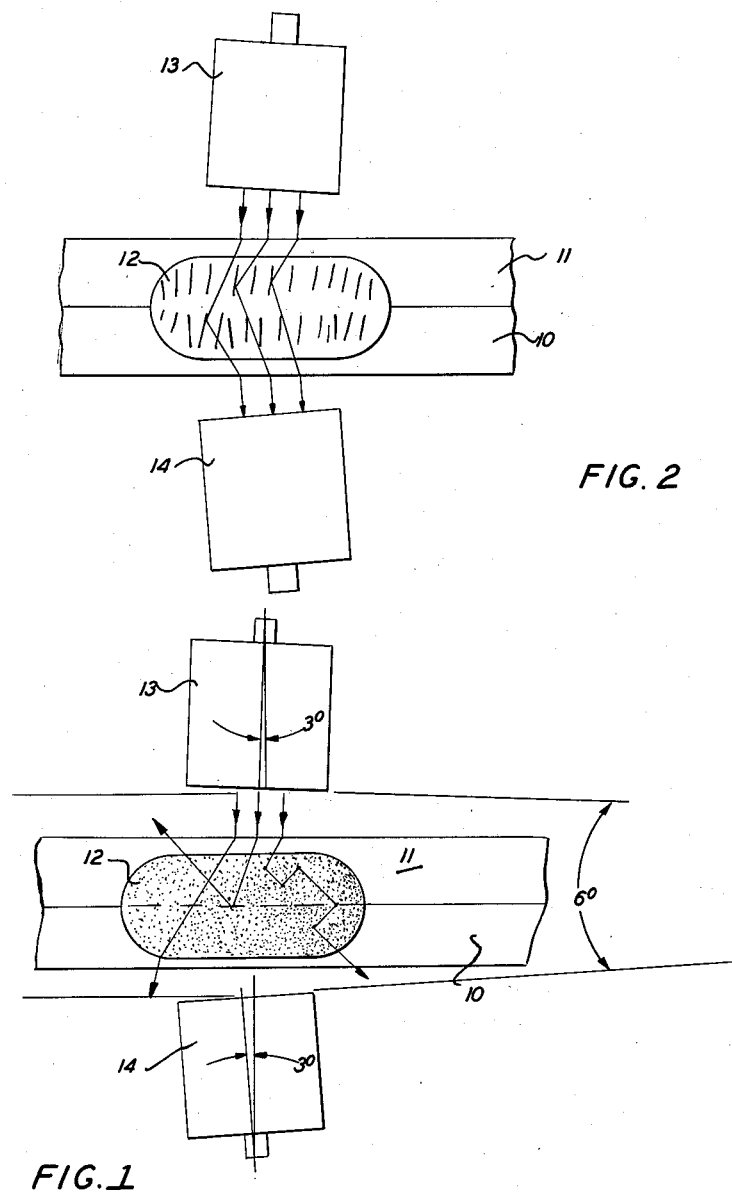

3,115,770
ULTRASONIC INSPECTION METHOD
Milton E. Cram, Detroit, and Donald D. Dodge, Dearborn, Mich., assignors to Ford Motor Company, Dearborn, Mich., a corporation of Delaware
Filed Dec. 17, 1962, Ser. No. 247,436
6 Claims. (Cl. 73—67.5)

This invention relates to testing techniques generally and more specifically to a non-destructive method for evaluating the characteristics of spot welds in sheet metal components. The conventional spot weld is made by assembling together two pieces of sheet metal, pressing opposite electrodes into firm contact with opposite sheets and then passing a heavy electrical current through the electrodes and sheet metal while continuing the pressure. The resistance of the sheet metal and more particularly the resistance of the joint between the two sheets of metal generates sufficient heat to fuse the sheets together locally.

This application is a continuation-in-part of copending application Serial No. 842,454 filed September 25, 1959, now abandoned.

In actual commercial work the quality of the welds produced may be uncertain due to many uncontrollable variables. Dirt and grease upon the surfaces to be welded are often productive of welds of questionable quality. The same deficiencies may arise from inadequate maintenance of the welding electrode tips. These tips tend to pit and burn and hence introduce electrical uncertainties into the welds.

The procedure of this invention for the non-destructive testing of spot welds can better be understood by a consideration of the two figures of drawings in which FIGURE 1 is a somewhat schematic view partially in cross section of the testing procedure as applied to a poor weld.

FIGURE 2 is also a somewhat schematic view partially in cross section of the testing procedure as applied to an acceptable weld.

In each of these figures of drawing, two sheets of metal, 10 and 11, are shown joined by a spot weld 12. Arranged adjacent spot welds 12 are shown sending transducer 13 and receiving transducer 14. A liquid couplant, not shown, is interposed between sending transducer 13 and receiving transducer 14.

Thus, a spot weld positioned between a first sheet of metal and a second sheet of metal that is in contact with the first sheet along a contact plane parallel to each of said sheets is inspected by positioning the weld and the two sheets between a sending transducer and a receiving transducer and aligning such transducers in a manner such that ultrasonic energy in passing from the sending transducer to the weld is focused along an axis or directed along a line that forms an acute angle with a line normal to the aforementioned contact plane and that ultrasonic energy passing through the weld and deflected along a line forming an acute angle with a line normal to such contact plane is received for measurement by the receiving transducer.

Experience has shown that in good welds a grain structure similar to that shown in FIGURE 2 is produced in which the grains are elongated in a direction normal to the face of the sheets. In a poor weld, the grains are smaller and their arrangement is random.

In actual testing procedures, about one-half inch separates the face of the sending transducer 13 nearest the sheet metal and the face of the receiving transducer 14 nearest the metal. The intervening space is filled with water which acts as a couplant. As clearly shown in FIGURE 1, the sending transducer 13 and the receiving transducer 14 are focused along axes which intersect the face of the sheet metal at an angle three degrees removed from the perpendicular. Otherwise stated, the angle between lines normal to the axis of the focus of the sending transducer 13 and the axis of the receiving transducer 14 intersect at an angle of six degrees.

Sending transducer 13 may operate continuously or it may be pulsed. It is preferred to employ the pulse technique. Good results have been obtained with sheet metal 0.062 inch thick using a frequency of 25 mc. The results obtained are tabulated as follows:

*Percent Full Scale*

| 0.062″ Panel Spot | Grade of Weld, percent | | | | |
|---|---|---|---|---|---|
| | AA-2 | BB-2 | CC-2 | DD-2 | EE-2 |
| 1 | 95 | 70 | 55 | 30 | 20 |
| 2 | 95 | 85 | 60 | 25 | 15 |
| 3 | 95 | 85 | 40 | 20 | 15 |
| 4 | 90 | 80 | 60 | 35 | 15 |
| 5 | 95 | 75 | 70 | 30 | 10 |
| 6 | 95 | 80 | 70 | 25 | 15 |
| 7 | 100 | 80 | 60 | 25 | 15 |
| 8 | 95 | 80 | 55 | 25 | 20 |
| 9 | 100 | 75 | 40 | 25 | 25 |
| 10 | 95 | 80 | 30 | 25 | 20 |

The columns designated AA–2 through EE–2 in the above table indicate tests which were run on five different panels. A different spot welding technique was used on each panel.

By employing a higher frequency, similar results may be obtained in thinner sheet metal. This was shown by the following experiment. The angle of incidence was changed to 31 degrees so that shear wave instead of a longitudinal wave would pass through the weld nugget. The velocity of the shear wave is forty-eight percent of a longitudinal wave so that the effective wave length is reduced by one-half.

It should be understood a spot weld may contain some grains having planes which are perpendicular to the face of the metal sheets and some grains having planes which are parallel to the face of the metal sheets. The predominance of one type of grain will cause a reading on the receiving transducer 14 which will indicate whether or not a particular spot weld is acceptable.

We claim:

1. A process for non-destructively inspecting the grain alignment of a spot weld positioned between a first sheet of metal and a second sheet of metal in contact with said first sheet along a contact plane parallel to a plane extending through the major axis of said first sheet and parallel to a plane extending through the major axis of said second sheet comprising the steps of positioning said sheets between a first device adapted to transmit ultrasonic energy and a second device adapted to receive and measure ultrasonic energy; transmitting ultrasonic energy from said first device through said first sheet, said spot weld and said second sheet at an acute angle to a line normal to said contact plane; and receiving and measuring with said second device ultrasonic energy reflected from grains of said weld aligned in a manner such that the major axis of each is substantially perpendicular to said contact plane.

2. A process for non-destructively inspecting the grain alignment of a spot weld positioned between a first sheet of metal and a second sheet of metal in contact with said first sheet along a contact plane parallel to a plane extending through the major axis of said first sheet and parallel to a plane extending through the major axis of said second sheet comprising the steps of positioning said sheets between a first device adapted to transmit ultrasonic energy and a second device adapted to receive and measure ultrasonic energy; transmitting ultrasonic energy from said first device to said first sheet along a line forming an angle of about 3° with a line normal to said contact plane and thence through said first sheet, said spot weld and said second sheet; and simultaneously receiving and measuring with said second device ultrasonic energy reflected from grains of said weld aligned in a manner such that the major axis of each is perpendicular to said contact plane.

3. A process for non-destructively inspecting internal structure of a spot weld positioned between a first sheet of metal and a second sheet of metal that is in contact with said first sheet of metal along a contact plane parallel to each of said sheets which comprises the steps of positioning said sheets between a first device adapted to transmit ultrasonic energy and a second device adapted to receive and measure ultrasonic energy so that said first device and said second device are positioned on opposite sides of said contact plane, transmitting ultrasonic energy from said first device through said first sheet, said weld and said second sheet to said second device, receiving and measuring with said second device ultrasonic energy thus transmitted through and deflected by said internal structure, said first device being positioned and aligned in a manner such that ultrasonic energy transmitted from said first device to said weld is directed along a line segment that forms an acute transmission angle with a line perpendicular to said contact plane, said second device being positioned and aligned to receive for measuring ultrasonic energy passed through and deflected by said internal structure through said second sheet along a line segment that forms an acute receiving angle with said line on the same side of said line as said transmission angle.

4. A process for non-destructively inspecting internal structural alignment of a spot weld positioned between a first sheet of metal and a second sheet of metal that is in contact with said first sheet of metal along a contact plane parallel to each of said sheets which comprises the steps of positioning said sheets between a first device adapted to transmit ultrasonic energy and a second device adapted to receive and measure ultrasonic energy so that said first device and said second device are positioned on opposite sides of said contact plane, transmitting ultrasonic energy from said first device through said first sheet, said weld and said second sheet to said second device, receiving and measuring with said second device ultrasonic energy thus transmitted through and deflected by said internal structural alignment of said weld, said first device being positioned and aligned in a manner such that ultrasonic energy transmitted from said first device to said weld is directed along a line segment that forms a transmission angle of between about 3° and about 31° with a line perpendicular to said contact plane, said second device being positioned and aligned to receive for measuring ultrasonic energy passed through and deflected by said internal structural alignment of said weld through said second sheet along a line segment that forms a receiving angle of between about 3° and about 31° with said line on the same side of said line as said transmission angle.

5. A process for non-destructively inspecting grain alignment of a spot weld positioned between a first sheet of metal and a second sheet of metal that is in contact with said first sheet of metal along a contact plane parallel to each of said sheets which comprises the steps of positioning said sheets between a first device adapted to transmit ultrasonic energy and a second device adapted to receive and measure ultrasonic energy so that said first device and said second device are positioned on opposite sides of said contact plane, transmitting ultrasonic energy from said first device through said first sheet, said weld and said second sheet to said second device, receiving and measuring with said second device ultrasonic energy thus transmitted through and deflected by said grain alignment of said weld, said first device being positioned and aligned in a manner such that ultrasonic energy transmitted from said first device to said weld is directed along a line segment that forms a transmission angle of between about 3° and about 31° with a line perpendicular to said contact plane, said second device being positioned and aligned to receive for measuring ultrasonic energy passed through and deflected by said grain alignment of said weld through said second sheet along a line segment that forms an acute receiving angle with said line on the same side of said line as said transmission angle and quantitatively essentially equal to said transmission angle.

6. A process for non-destructively inspecting grain alignment of a spot weld positioned between a first sheet of metal and a second sheet of metal that is in contact with said first sheet of metal along a contact plane parallel to each of said sheets which comprises the steps of positioning said sheets between a first device adapted to transmit ultrasonic energy and a second device adapted to receive and measure ultrasonic energy so that said first device and said second device are positioned on opposite sides of said contact plane, transmitting ultrasonic energy from said first device through said first sheet, said weld and said second sheet to said second device, receiving and measuring with said second device ultrasonic energy thus transmitted through and deflected by said grain alignment of said weld, said first device being positioned and aligned in a manner such that ultrasonic energy transmitted from said first device to said weld is directed along a line segment that forms a transmission angle of about 3° with a line perpendicular to said contact plane, said second device being positioned and aligned to receive for measuring ultrasonic energy passed through and deflected by said grain alignment of said weld through said second sheet along a line segment that forms an acute receiving angle with said line on the same side of said line as said transmission angle and quantitatively essentially equal to said transmission angle.

References Cited in the file of this patent

UNITED STATES PATENTS

| | | |
|---|---|---|
| 2,433,963 | Tarbox et al. | Jan. 6, 1948 |
| 2,505,867 | Meunier | May 2, 1950 |
| 2,545,309 | Roberts | Mar. 13, 1951 |
| 2,795,133 | Ots | June 11, 1957 |